Figure 1:
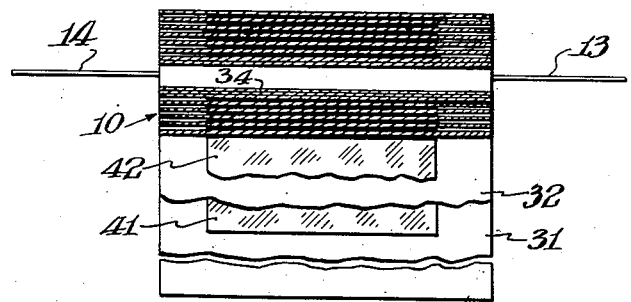

Oct. 1, 1957

W. C. LAMPHIER ET AL 2,808,357

ELECTRICAL CONDENSERS

Filed July 16, 1951

INVENTORS
Walter C. Lamphier
Paul H. Netherwood

BY Connolly and Hutz

ATTORNEYS

2,808,357

ELECTRICAL CONDENSERS

Walter C. Lamphier and Paul H. Netherwood, Williamstown, Mass., assignors to Sprague Electric Company, North Adams, Mass., a corporation of Massachusetts Application July 16, 1951, Serial No. 237,006

4 Claims. (Cl. 154—80)

This invention relates to new and improved methods of manufacturing wound condenser sections, and in particular to condenser structures produced by these methods.

At the present time it is customary to produce small rolled condenser sections by winding together two or more electrode foils separated by a dielectric spacer, and then placing the wound unit inside of a separately produced protective casing of one sort or another. The type of casing used depends upon the number of factors such as the use of the resultant unit.

The condensers produced in this manner are satisfactory for most applications. However, they have the defect that their performance is limited by the physical and electrical properties of the dielectrics used. Oil and wax impregnated papers are probably the most commonly used dielectric spacers used at the present time. In the copending Robinson and Peck application, Serial Number 237,049, filed July 16, 1951, now U. S. Patent No. 2,735,970, rolled condenser sections are disclosed which have greatly improved performance characteristics as compared with the performance characteristics of these conventional condensers.

It is an object of this invention to improve upon the condenser sections disclosed in this copending application. Another object is to produce rolled condenser sections having the advantages of the sections produced according to aforesaid Robinson and Peck application which do not require a separately produced protective casing. These and other objects will be apparent from this specification and the appended claims.

These objects are attained by virtue of the discovery that capacitors wound with a substantial excess of a dielectric spacer material comprising a substantially linear oriented thermoplastic polyester film conforming to the recurrent formula:

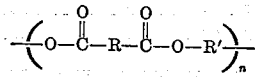

wherein R represents a bivalent radical containing the benzene nucleus, and R' represents a bivalent aliphatic radical containing from 2 to 8 carbon atoms, can be subjected to a heat and pressure molding operation which fuses and completely disorients the outer polyester layers without deformation of the interior of the capacitor winding, and relaxes the molecular orientation of these layers. Condensers with their cores treated in this manner have increased volumetric efficiency.

The preferred polyester used in accordance with this invention is a linear condensation polymer of terephthalic acid and ethylene glycol sold under the trade name "Terylene." Other polyesters which may be used are the condensation polymers of terephthalic acid and various alkane diols such as propylene and butylene glycol, and of chlorinated or otherwise substituted dibasic aromatic acids with substituted glycols.

Condenser sections produced with this invention are formed as indicated in the copending Robinson and Peck application, Serial Number 237,049, filed July 16, 1951, now U. S. Patent No. 2,735,970, by winding alternating electrode foils and oriented polyester films of the class given above into a rolled condenser unit. Several external turns of these polyester films are placed around the outside of the unit beyond the last windings of the electrode foils. These turns may be applied separately to a wound unit after it has been formed or may be merely a continuation of the dielectric winding.

These sections formed in this manner are next preferably heat treated in any of the manners indicated in said copending Robinson and Peck application in order to partially relax the molecular orientation of the films employed, and to shrink these films into compact, substantially void free condenser units. For half-inch wound "one paper" capacitor sections employing ¼ mil electrode foils and 1 mil "Terylene" films, five outer turns of the "Terylene" around the unit are satisfactory when heated at 200° C. for a 30 minute period in a silicone oil bath in one modification of the heat treatment disclosed in said application. With "Terylene" films, temperatures of from 165° C. to 218° C. are sufficient to accomplish the desired relaxing of the molecular orientation. The periods of treatment necessary for this to occur will of course vary with the specific units being treated. Conventional heating in an oven gives satisfactory results in forming these heated units.

Figure 2:
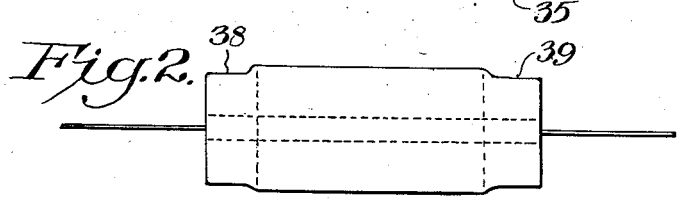
Figure 3:
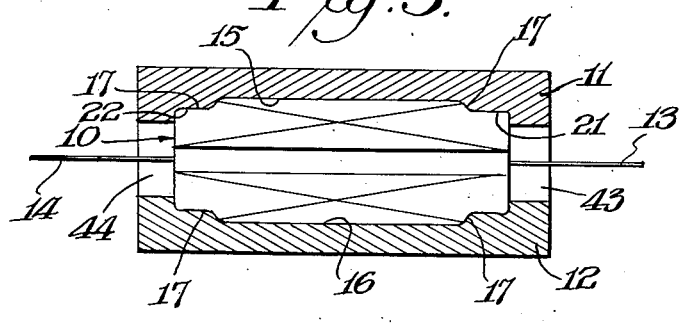
Figure 4:
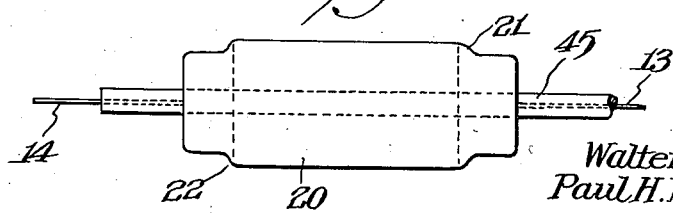

The further processing of condenser units will best be understood with reference to the drawings, in which Fig. 1 is a sectional view of a wound condenser unit representing a step in the practice of the present invention, the unit being partially unwound to better show its construction; and Figs. 2, 3 and 4 are similar views showing subsequent steps in accordance with the present invention.

As shown in Fig. 1 a condenser section 10 is wound from oriented polyethylene terephthalate ribbons 31, 32 and metal foils 41, 42. The metal foils are narrower than the resin ribbons, and extend several turns short of the inner end 34 and outer end 35 of the winding. Leads 13 and 14 are inserted in contact with the respective foils and project from each side of the winding.

The fully wound section, after the completion of the relaxation heat treatment, is illustrated in Fig. 2. As a result of the shrinkage of the resin ribbons, the sides 38, 39 of the wound edges are drawn in so that their diameter decreases. In the intervening portion of the section the presence of the metal foil between the resin layers keep this portion from a corresponding degree of shrinkage.

A wound condenser section 10 which has been treated as indicated above is next placed between two matched molds 11 and 12 which are formed with interior cavities 15 and 16 conforming to the desired shape of the finished product. This is illustrated in Fig. 3, and shoulders 17 are preferably formed within this cavity to reduce the size of the end portions of the molded sections. Appropriate spaces 43, 44 are provided so that the terminal leads 13 and 14 may project from molds 11 and 12 during this molding operation.

Condenser sections in which "Terylene" has been used are preferably subjected to pressures reaching from about 10 to about 5000 pounds, and mold temperatures of from about 220° C. to about 250° C. for periods of about 1 second to about 5 minutes in the indicated variety of mold. The exact temperatures, pressures and treatment periods required during this molding step will vary with the type of unit being treated, and with the resin used. The molding conditions are such that the outside layers of resin are fused to one another, and their molecular orientation is largely destroyed, while partial orientation of the interior films is unchanged.

This molding operation serves to produce a condenser section of the type (Fig. 3) having projecting electrode tabs 13 and 14, and reduced shoulders 21 and 22. The outside of such a condenser section is extremely hard, and does not require further protection by a protective casing. These condensers may be used and shipped directly as soon as they have cooled following the molding step. They are substantially void free as a result of the pre-molding step indicated.

The pre-treatment step may in certain applications be dispensed with, although in such cases the condenser units formed are apt to be subjected to difficulties due to entrapped air.

Hard cores for the condenser sections employed with this invention may be conveniently prepared by subjecting the central mandrel hole usually found in such units after winding, to a similar heat molding step. Sections which are to be treated in this manner are first wound about a mandrel with several extra internal layers of an oriented polyester film conforming to the indicated formula, and are then pre-treated so as to relax their molecular orientation as set forth above. An implement capable of being heated is then placed in the mandrel opening, and the implement is heated beyond the melting point of polyester in order to fuse these internal windings to one another. Care is exercised so that this heating does not disturb the molecular orientation of the interior windings of the unit.

With "Terylene" films temperatures of from about 220° C. to about 250° C. are satisfactory for this internal heating. Fig. 4 shows such an operation by which a ½ inch diameter condenser unit of the type indicated above wound with a ⅛ inch mandrel opening surrounded by 3 layers of 1 mil "Terylene" film can be satisfactorily internally fused by an electrically heated rod 45 at 240° C. thrust through the opening for a period of 2 minutes. After this period the rod is withdrawn. Other temperatures and heating periods will of course be required with other polyester films and film thicknesses.

The thickness of either the internal or external fused layer required will of course vary with the specific application. Satisfactory external casings can be prepared with 2 to 20 mil thick "Terylene" windings. Similarly thick central fused condenser cores may be prepared with this resin.

Optionally, the external treatment may be accomplished with a soldering iron, hot air torch or other device of this nature. The temperature should be such that the outer surface is substantially completely fused and disoriented, and discrete film layers no longer exist.

Various modifications of the invention will be suggested to those skilled in the art by this specification. Such changes are to be considered part of this invention in so far as they are defined by the appended claims.

We claim:

1. The process of making condensers that do not need separate casings or cores, said process comprising the steps of convolutely winding on a mandrel layers of oriented dielectric resin film and metal foil, said resin being a substantially linear polyester conforming to the recurrent formula:

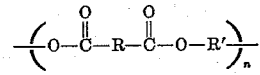

wherein R stands for a bivalent radical containing the benzene nucleus, and R' stands for a bivalent aliphatic radical containing from 2 to 8 carbon atoms, the film being wider than the foil and projecting beyond the foil on each side of the winding, starting and finishing the winding with several extra layers of the film free of the foil, removing the wound unit from the mandrel, heating said unit below the melting point of the film at a temperature and for a time sufficient to relax said orientation and shrink the layers, and then thermally fusing together the extra internal layers, the extra external layers and each side edge of all the resin layers, respectively.

2. The process of claim 1 in which the thermal fusing step is carried out by pressure molding the unit with heated molds.

3. The process of making condensers that do not need separate casings or cores, said process comprising the steps of convolutely winding on a mandrel layers of oriented dielectric resin film and electrically conductive strata, said resin being a substantially linear polyester conforming to the recurrent formula:

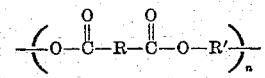

wherein R stands for a bivalent radical containing the benzene nucleus, and R' stands for a bivalent aliphatic radical containing from 2 to 8 carbon atoms, the film being wider than the strata and projecting beyond the strata on each side of the winding, starting and finishing the winding with several extra layers of the film free of conductive strata, removing the wound unit from the mandrel, and then thermally fusing together the extra internal layers, the extra external layers and each side edge of all the resin layers, respectively.

4. The process of claim 3 in which the resin is polyethylene terephthalate.

References Cited in the file of this patent

UNITED STATES PATENTS

| 836,863 | Clausen | Nov. 27, 1906 |
| 1,010,936 | Mierowsky | Dec. 5, 1911 |
| 1,829,015 | Reiher | Oct. 27, 1931 |
| 2,177,266 | Schupp | Oct. 24, 1939 |
| 2,256,160 | Britton | Sept. 16, 1941 |
| 2,456,381 | Clark | Dec. 14, 1948 |
| 2,479,400 | Pecoroni | Aug. 16, 1949 |
| 2,497,376 | Swallow | Feb. 14, 1950 |
| 2,548,862 | Brandt | Apr. 17, 1951 |

FOREIGN PATENTS

| 507,242 | Great Britain | June 7, 1939 |
| 595,657 | Great Britain | Dec. 11, 1947 |